US008469667B2

(12) United States Patent
Girard

(10) Patent No.: US 8,469,667 B2
(45) Date of Patent: Jun. 25, 2013

(54) DISTRIBUTED-MASS DEVICE FOR REDUCING VIBRATION GENERATED BY A ROTORCRAFT LIFT ROTOR, AND A ROTOR HUB FITTED WITH SUCH A DEVICE

(75) Inventor: Vincent Girard, Venelles (FR)

(73) Assignee: Eurocopter, Marignane Cedex (FR)

( * ) Notice: Subject to any disclaimer, the term of this patent is extended or adjusted under 35 U.S.C. 154(b) by 510 days.

(21) Appl. No.: 12/783,608

(22) Filed: May 20, 2010

(65) Prior Publication Data

US 2010/0296931 A1 Nov. 25, 2010

(30) Foreign Application Priority Data

May 20, 2009 (FR) ...................................... 09 02455

(51) Int. Cl.
*F01D 5/02* (2006.01)
(52) U.S. Cl.
USPC .......................................... 416/144; 416/500
(58) Field of Classification Search
USPC .................. 415/119; 416/79, 80, 81, 82, 144, 416/145, 500; 244/17.11, 17.27
See application file for complete search history.

(56) References Cited

U.S. PATENT DOCUMENTS

| | | | |
|---|---|---|---|
| 3,219,120 A | | 11/1965 | Hooper |
| 3,540,809 A | * | 11/1970 | Mard et al. .......................... 416/1 |
| 3,836,098 A | * | 9/1974 | Miyashita ................... 244/17.27 |
| 4,239,455 A | | 12/1980 | Broekhuizen et al. |
| 4,255,084 A | | 3/1981 | Mouille et al. |
| 4,764,035 A | * | 8/1988 | Boyd .............................. 384/152 |
| 5,639,214 A | * | 6/1997 | Guimbal ........................ 416/145 |
| 6,045,090 A | | 4/2000 | Krysinsky et al. |
| 6,174,086 B1 | * | 1/2001 | Ng et al. .......................... 384/45 |
| 6,494,680 B2 | | 12/2002 | Cardin |

FOREIGN PATENT DOCUMENTS

| | | |
|---|---|---|
| FR | 2 416 838 | 9/1979 |
| FR | 2 435 391 | 4/1980 |
| FR | 2 486 906 | 1/1982 |
| FR | 2 733 483 | 10/1996 |
| FR | 2 749 901 | 12/1997 |
| FR | 2 808 256 | 11/2001 |
| WO | 2005/079200 | 9/2005 |

OTHER PUBLICATIONS

French Search Report dated Feb. 8, 2010, from corresponding French application.

* cited by examiner

*Primary Examiner* — Edward Look
*Assistant Examiner* — Christopher J Hargitt
(74) *Attorney, Agent, or Firm* — Brooks Kushman P.C.

(57) ABSTRACT

A distributed mass device for reducing the vibration generated by a rotor, includes a support suitable for being constrained in rotation about an axis of rotation of the lift rotor. The distributed mass device further includes at least two main oscillating masses each provided with a through longitudinal recess, and each being connected to the support by respective deformable elements, the main oscillating masses being constrained to move solely in a horizontal plane by the deformable elements. The distributed mass device is provided with a secondary oscillating mass per main oscillating mass, each secondary oscillating mass being suspended inside the recess of the associated main oscillating mass by resilient elements.

13 Claims, 3 Drawing Sheets

DISTRIBUTED-MASS DEVICE FOR REDUCING VIBRATION GENERATED BY A ROTORCRAFT LIFT ROTOR, AND A ROTOR HUB FITTED WITH SUCH A DEVICE

FIELD OF THE INVENTION

The present invention relates to a distributed-mass device for reducing the vibration generated by a rotorcraft lift rotor, and to the hub of a rotor fitted with such a distributed-mass device.

The operation of a rotorcraft lift rotor, e.g. a main lift and propulsion rotor of a helicopter, generates parasitic forces in the head of the lift rotor. These parasitic forces then give rise to vibration that propagates in the fuselage, which vibration is particularly perceptible in the cockpit of the rotorcraft.

BACKGROUND OF THE INVENTION

To mitigate that drawback, devices have been made that are arranged on the rotor head. In a first solution, devices are known that seek to concentrate an oscillating mass in the vicinity of the axis of rotation of the rotor, which devices are referred to as "concentrated-mass devices" for convenience.

According to document FR 2 416 838, a first concentrated-mass device is mounted on the top portion of the hub in order to reduce said vibration.

That first concentrated-mass device includes an oscillating mass that is held radially in a housing that is secured to the hub by resilient means. The oscillating mass is also fastened to the top end of a rod.

The rod is placed substantially on the axis of rotation of the rotor in a recess in the rotor mast of the rotor. The bottom end of the rod is then hinged at a point that is situated on the axis of rotation of the rotor.

Thus, with the resilient means tending to keep the oscillating mass in a rest position, the oscillating mass moves in a plane that is substantially parallel to the top portion of the lift rotor hub. The oscillating mass then directly opposes the vibration generated by the rotor.

Nevertheless, the forces that induce the vibration that is to be reduced and that is generated in the head of the rotor may be described by a force torsor, sometimes referred to by the person skilled in the art as the "rotor head torsor". The rotor head torsor is made up of three moments together with three resultants relative to three mutually perpendicular axes, namely:

two axes referred to, for convenience below, as the "first and second resultant axes" defining a plane referred to below as the "first resultant plane" extending parallel to the rotor hub; and an axis referred to below as the "third resultant axis" that is perpendicular to said first resultant plane.

The first concentrated-mass device is then effective in filtering the resultant forces of the "rotor head torsor" along the first and second resultant axes that are substantially parallel to the plane containing said oscillating mass, but is ineffective for the resultant force of the "rotor head torsor" directed along the third resultant axis that is substantially parallel to the axis of rotation of the lift rotor and perpendicular to the plane containing the oscillating mass.

Furthermore, since the oscillating mass used is constant, the first concentrated-mass device is particularly effective when the excitation frequency of the vibration that is to be reduced is close to the resonant frequency of said oscillating mass, which frequency is in fact constant.

The first concentrated-mass device is thus not really suitable for variable frequencies.

To remedy that, a second concentrated-mass device is disclosed in document FR 2 749 901.

Like the first concentrated-mass device, the second concentrated-mass device has a main oscillating mass held radially in a housing. In addition, it is provided with an adjuster oscillating mass suitable for sliding along the rod that is secured to the main oscillating mass and that is hinged at a point situated on the axis of rotation of the rotor.

By moving the adjuster oscillating mass, it then becomes possible to adapt the second concentrated-mass device so as to enable it to reduce vibration at varying frequencies.

Nevertheless, it continues not to filter the resultant forces of the "rotor head torsor" along all three mutually perpendicular axes, in particular it does not filter vibration along the third resultant axis that is substantially parallel to the axis of rotation of the lift rotor.

Unlike the first above-mentioned solution, a second solution seeks to distribute the oscillating masses about the axis of rotation of the lift rotor by means of devices that are referred to as "distributed mass devices" for convenience.

Document WO 2005/079200 presents a first distributed mass device having two coaxial masses and control means, the control means being suitable for controlling the angular velocity of said masses and their angular positions.

Like the first and second concentrated-mass devices, the first distributed mass device appears to be insufficient to counter the resultant forces of the "rotor head torsor" along three mutually perpendicular axes, and more particularly to counter the resultant force along the third resultant axis that is substantially parallel to the axis of rotation of the lift rotor.

Similarly, Document FR 2 435 391 presents a second distributed mass device having two masses fastened to a shaft passing through the cuff connecting the blade to the hub of a lift rotor.

Document FR 2 808 256 presents a third distributed mass device provided with oscillating masses located between the blades.

Each mass is then connected by a pivoting connection to an arm of a support secured to the rotor hub in such a manner as to constitute a pendulum.

Under those conditions, the third distributed mass device would appear to be capable of countering the resultant forces of the "rotor head torsor" along three mutually perpendicular axes.

However, it is particularly difficult to adjust the third distributed mass device, which device is effective either in countering the resultant forces of the "rotor head torsor" along the first and second resultant axes substantially parallel to the plane containing the support of the masses, or else it is effective in countering the resultant force of the "rotor head torsor" along the third resultant axis that is substantially parallel to the axis of rotation of the lift rotor.

Document FR 2 733 483 presents a fourth distributed mass device having at least one pendular body mounted on the rotor so as to be capable of oscillating about a pendular movement axis that is spaced apart from the center of inertia of the pendular body.

Although satisfying certain needs, the above-mentioned limits would seem to remain.

Consequently, the state of the art provides either devices that are suitable for filtering the resultant forces of the "rotor head torsor" along one or two axes, or else devices that are suitable for filtering the resultant forces of the "rotor head torsor" along three mutually perpendicular axes, but that are relatively difficult to adjust to obtain results that are of good performance along all three mutually perpendicular axes.

OBJECT AND SUMMARY OF THE INVENTION

An object of the present invention is thus to provide a distributed-mass device for reducing the vibration generated by a rotorcraft lift rotor, which device is effective in countering the resultant forces of the "rotor head torsor" along all three of its mutually perpendicular axes.

According to the invention, a distributed mass device for reducing the vibration generated by a rotorcraft lift rotor having a hub comprises a support suitable for being constrained in rotation about an axis of rotation of the lift rotor, said support being suitable for being fastened to the hub of the lift rotor.

Furthermore, the distributed mass device is remarkable in that it comprises at least two main oscillating masses each having a through longitudinal recess, the main oscillating masses being distributed around the support, each being connected to the support by deformable means, the main oscillating masses being constrained to move solely in a horizontal plane by the deformable means. The distributed mass device is thus provided with a secondary oscillating mass per main oscillating mass suspended inside the recess of the associated main oscillating mass by resilient means so as to be capable of moving along a direction that is perpendicular to said horizontal plane.

Each main oscillating mass is thus provided with a secondary oscillating mass that is suspended inside its recess.

It should be observed that the plane in which each main oscillating mass is maintained is referred to for convenience as a horizontal plane insofar as, when the distributed mass device is arranged on a rotorcraft rotor:

said plane is substantially horizontal when the rotorcraft is standing on the ground; and said plane is perpendicular to the vertical axis of rotation of the rotor.

Consequently, the main oscillating masses, and thus also the secondary oscillating masses, are suitable for moving in a plane that is referred to for convenience as the "horizontal plane" insofar as it is parallel to the first resultant plane of the "rotor head torsor" and is substantially perpendicular to the vertical axis of rotation of the rotor, for the purpose of filtering the resultant forces of said "rotor head torsor" along the first and second resultant axes.

In addition, since each secondary oscillating mass is suspended inside a main oscillating mass, each secondary oscillating mass is suitable for moving about an equilibrium position in a vertical direction perpendicular to the horizontal plane in which each main oscillating mass moves about a rest position. The secondary oscillating masses then filter the resultant force of the "rotor head torsor" along a third resultant axis.

Consequently, the distributed mass device of the invention is easily adjustable since only the secondary oscillating masses present action along said vertical axis.

The distributed mass device of the invention may also include one or more of the following additional characteristics.

For example, the main oscillating masses are advantageously distributed in equidistant manner around the support.

If the distributed mass device has a small number of main oscillating masses, e.g. fewer than four, then an equidistant distribution serves to avoid any unwanted unbalance.

With greater numbers, more complex distributions can be envisaged.

Thus, the deformable means may comprise a deformable blade per main oscillating mass for connecting each main oscillating mass to the support while leaving it free to move in a horizontal plane substantially parallel to the first resultant plane of the "rotor head torsor" and to the hub when the distributed mass device is arranged on a lift rotor.

In a first embodiment, the deformable means comprise a single deformable blade per main oscillating mass. Each main oscillating mass is then fastened to the support by a single deformable blade, so each main oscillating mass describes circular movement about a rest position.

In a second embodiment, said deformable means comprise at least two deformable blades per main oscillating mass to provide a deformable parallelogram connecting each main oscillating mass to said support. Each main oscillating mass is then fastened to the support by at least two deformable blades, which blades are advantageously mutually parallel, so each main oscillating mass describes movement that is not circular but rather in circular translation about a rest position.

A body that performs movement in circular translation is a body moving in translation in a plane along a path that is circular, i.e. with two distinct points of said body describing two circular trajectories that have the same radius but different centers.

Independently of the embodiment, each deformable blade extends radially from the support so as to be fastened to the associated main oscillating mass, the deformable blades possibly all having the same length.

Furthermore, in order to guarantee that the secondary oscillating masses move in vertical directions, parallel to the axis of rotation of the rotor and of the hub of the rotorcraft fitted with the invention, the distributed mass device includes a guide means per secondary oscillating mass to guide the movement in translation of the secondary oscillating mass relative to the associated main mass in a vertical direction with small clearance and little friction.

For example, the guide means may comprise a ball bushing arranged between the main oscillating mass and the associated secondary oscillating. Reference may be made to the literature to obtain more information concerning ball bushings, also known as "linear bearings".

In a variant, it is possible for the guide means to comprise a ring covered in a self-lubricating material, e.g. Teflon®, or made out of a material that is known for its low coefficient of friction, such as bronze.

Furthermore, each resilient means optionally comprises first and second springs. Each secondary oscillating mass may then be arranged inside the associated main oscillating mass between the first and second springs of the corresponding resilient means.

Under such circumstances, the first and second springs are advantageously respectively prestressed between:

the secondary oscillating mass and first closure means for closing the recess of the associated main oscillating mass; and the secondary oscillating mass and second closure means for closing the recess of the associated main oscillating mass.

In a vertical direction, there can then be found in succession: a first closure means, a first spring, a secondary oscillating mass, a second spring, and a second closure means.

Consequently, it is advantageous but not essential for a first end of the first spring to be secured to the associated secondary oscillating mass and for a first end of the second spring to be secured to the same associated secondary oscillating mass.

Finally, a main oscillating mass and the associated secondary oscillating mass may optionally be cylindrical in shape.

In addition to providing a distributed mass device for reducing the vibration generated by a lift rotor, the invention also provides a rotorcraft lift rotor hub having a bottom portion suitable for being secured to a rotorcraft rotor mast.

Such a hub is then remarkable in that it has a top portion, substantially parallel to its bottom portion, and constrained in rotation with the support of a distributed mass device of the invention.

BRIEF DESCRIPTION OF THE DRAWINGS

The invention and its advantages appear in greater detail from the following description of embodiments given by way of illustration and with reference to the accompanying figures, in which.

MORE DETAILED DESCRIPTION

Elements that are present in more than one of the figures are given the same references in each of them.

Figure 1:
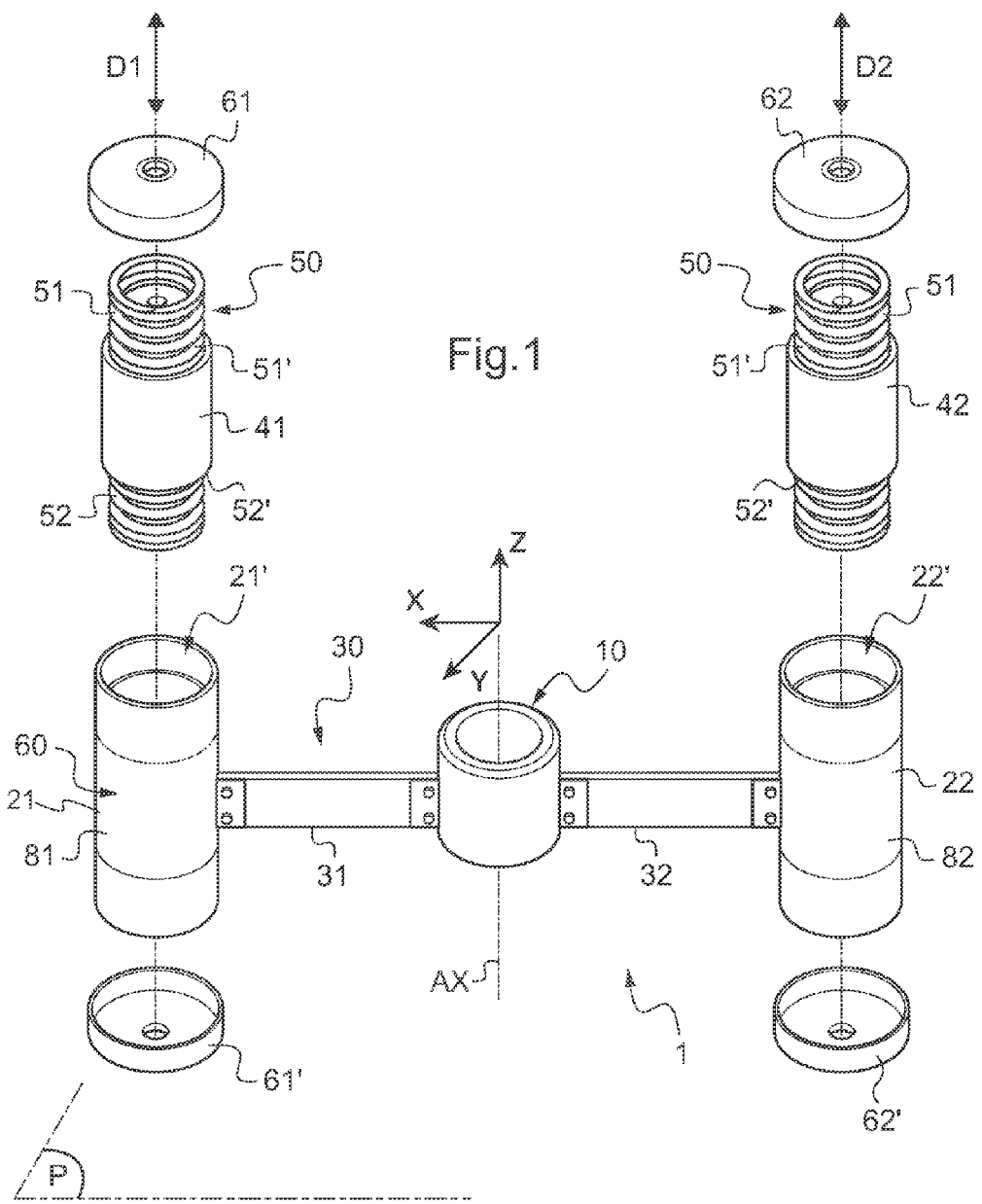
FIG. 1 is a diagram showing a distributed mass device in a first embodiment.
Figure 2:
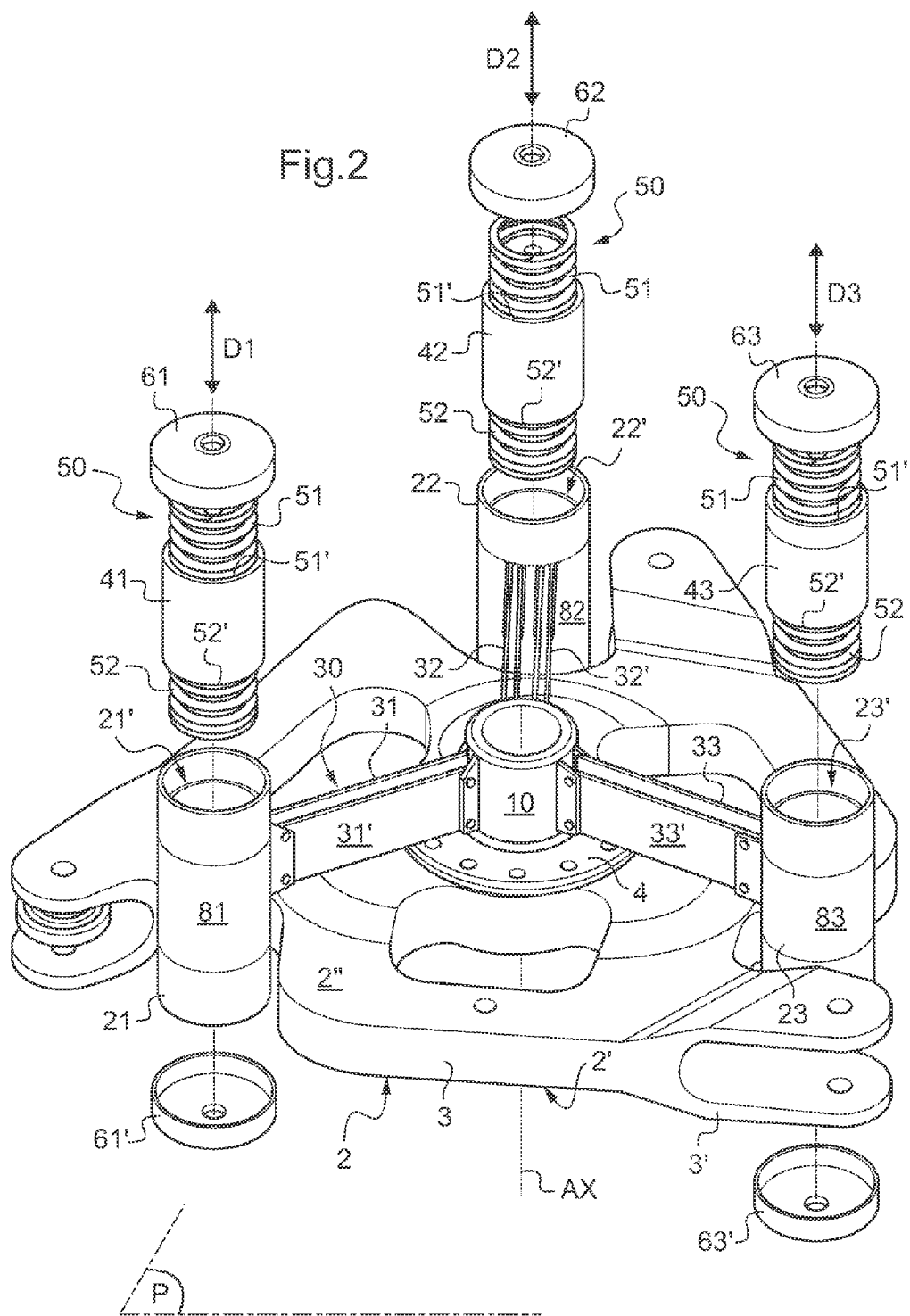
FIG. 2 is a diagram showing a distributed mass device in a second embodiment arranged on a rotor hub.

It should be observed that three mutually orthogonal axes X, Y, and Z are shown in FIGS. 1 and 2, with the resultant forces of a "rotor head torsor" being directed parallel to these three axes.

The axes X and Y are referred to respectively as the "first horizontal axis" and the "second horizontal axis". The first and second horizontal axes together define a horizontal plane P.

In contrast, the axis Z is referred to as the "vertical axis". This vertical axis Z is thus perpendicular to the horizontal plane P.

FIG. 1 is a diagram showing a first embodiment of a distributed mass device 1.

Independently of the embodiment, this distributed mass device 1 comprises a support 10 shown as being of cylindrical shape in the figures even though this shape is not essential. The support 10 extends vertically along an axis that is to coincide with the axis of rotation AX of the rotor that is to receive the distributed mass device 1.

Furthermore, the distributed mass device 1 is provided with at least two main oscillating masses 21. In the example shown in FIG. 1, the distributed mass device 1 has two main oscillating masses 21, 22, each main oscillating mass 21, 22 being connected to the support 10 via respective deformable means 30. In contrast, in the variant shown in FIG. 2, there are three main oscillating masses 21, 22, 23, with each main oscillating mass 21, 22, 23 being connected to the support 10 via a respective deformable means 30.

Under such circumstances, and under the effect of the forces generated by the lift rotor fitted with the distributed mass device 1, the main oscillating masses 21, 22 are constrained by the deformable means 30 to move in the horizontal plane P that is designed to be parallel with the hub of the lift rotor and perpendicular to the axis of rotation AX of the lift rotor.

This movement of the main oscillating masses in the horizontal plane P serves to filter the resultant forces of the "rotor head torsor" along the first and second resultant axes.

Furthermore, with reference to FIGS. 1 and 2, in order to filter the resultant of the "rotor head torsor" along the third resultant axis, and independently of the embodiment, the distributed mass device 1 includes one secondary oscillating mass 41, 42, 43 per main oscillating mass 21, 22, 23.

Consequently, each main oscillating mass 21, 22, 23 possesses a recess 21', 22', 23' passing longitudinally through the main oscillating mass 21, 22, 23, e.g. right through. Thus, the main oscillating masses 21, 22, 23 are hollow cylinders, for example. A secondary oscillating mass 41, 42, 43 is then suspended inside the recess 21', 22', 23' by resilient means 50 so as to be capable of moving along a vertical direction D1, D2, D3 parallel to the axis of rotation of the lift rotor and thus perpendicular to the horizontal plane P.

Advantageously, each resilient means 50 is provided with first and second springs 51, 52 with a secondary oscillating mass 41, 42, 43 sandwiched between them inside a recess 21', 22', 23' of a main oscillating mass 21, 22, 23.

More precisely, first end 51' of a first spring 51 presses against a top face of a secondary oscillating mass 41, 42, 43, while the second end of the first spring 51 is in abutment against first closure means 61, 62, 63 for closing the recess 21', 22', 23' in the associated main oscillating mass 21, 22, 23. Similarly, the first end 52' of a second spring 52 bears against a bottom face of a secondary oscillating mass 41, 42, 43, while the second end of the second spring 52 comes into abutment against second closure means 61', 62', 63' for closing the recess 21', 22', 23' of the associated main oscillating mass 21, 22, 23.

Thus, each spring is prestressed between the secondary mass and a closure means, without being fastened to the secondary oscillating mass. The prestress is adjusted to ensure that there can be no loss of contact between a spring and the secondary oscillating mass when said secondary oscillating mass is in an extreme position.

It should be observed that the first and second closure means 61, 62, 63, 61', 62', 63', or lids, are fastened to the associated main oscillating masses by conventional means, e.g. being screwed thereon.

In order to ensure that the movement of the secondary oscillating masses 41, 42, 43 inside the main oscillating masses is not impeded by friction, the distributed mass device 1 of the invention advantageously includes guide means 60.

For example, the guide means 60 may be constituted by one ball bushing 81, 82, 83 per main oscillating mass 21, 22, 23, each ball bushing being fastened inside a recess 21', 22', 23' between a main oscillating mass 21, 22, 23 and the associated secondary oscillating mass 41, 42, 43.

This guarantees that each secondary oscillating mass 41, 42, 43 moves in translation along a vertical direction D1, D2, D3.

Figure 3:
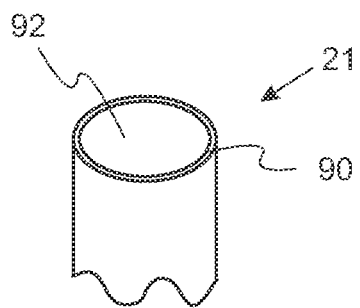
FIG. 3 is a diagram showing a portion of the distributed mass device of FIG. 1 according to a second embodiment.

In another embodiment, as illustrated in FIG. 3, the guide means 60 may include a ring 90 covered in a self-lubricating material 92, e.g. Teflon®, or made out of a material that is known for its low coefficient of friction, such as bronze.

Finally, it should be observed in FIGS. 1 and 2, that the main oscillating masses 21, 22, 23 are at equal distances from the support 10 and they are distributed around the support 10 in equidistant manner.

Furthermore, the main oscillating masses 21, 22, 23 of a distributed mass device 1 are identical and cylindrical in shape.

The same applies to the secondary oscillating masses 41, 42, 43, which:

are at equal distances from the support 10;
    are distributed around the support 10 in equidistant manner;
    are identical; and
    are cylindrical in shape.

In the first embodiment shown in FIG. 1, the deformable means comprise one deformable blade 31, 32 per main oscillating mass 21, 22.

A first deformable blade 31 is then fastened to the support 10 by conventional means, e.g. being fastened by screws to the cheeks of a fork of the support 10, for example. The first deformable blade 31 then extends radially in the horizontal plane P to be fastened to a first main oscillating mass 21 by conventional means, e.g. being screwed to the cheeks of a fork of the first main oscillating mass 21.

Likewise, a second deformable blade 32 is fastened to the support 10 by conventional means, and then extends radially in the horizontal plane P to be fastened to a second main oscillating mass 22 by conventional means.

The main oscillating masses, and indeed the associated secondary oscillating masses, are then in a position to perform circular movement in the horizontal plane P.

With reference to FIG. 2, in a second embodiment, the deformable means comprise two deformable blades per main oscillating mass.

Thus, a first primary deformable blade 31 and a first secondary deformable blade 31' are fastened to the support 10 by conventional means and extend radially in the horizontal plane P to be fastened to a first main oscillating mass 21 by conventional means.

The first primary and secondary deformable blades 31 and 31' are substantially parallel to each other in a rest position.

The assembly comprising the first primary and secondary deformable blades 31 and 31' together with the support 10 and the first main oscillating mass 21 then forms a deformable parallelogram. Consequently, the first main oscillating mass 21, and also the associated first secondary oscillating mass 41, is then suitable for performing movement in circular translation in the horizontal plane P.

The variant of the second embodiment, as shown in FIG. 2 and having three main oscillating masses 21, 22, 23, thus has deformable means further comprising:

- a second primary deformable blade 32 and a second secondary deformable blade 32' fastened to the support 10 by conventional means and extending radially in the horizontal plane P to be fastened to a second main oscillating mass 22 by conventional means; and
- a third primary deformable blade 33 and a third secondary deformable blade 33' fastened to the support 10 by conventional means and extending radially in the horizontal plane P to be fastened to the third main oscillating mass 23 by conventional means.

Finally, FIG. 2 also shows a hub 2 having a plurality of arms 3 suitable for receiving respective rotorcraft blades, each arm 3 including an offset 3' for fastening a damper, for example.

The hub 2 has a bottom portion 2' suitable for being fastened to the mast of a rotor, and a top portion 2", with the support 10 of a distributed mass device 1 of the invention being fastened to the top portion 2" by connection means 4 extending around an axis of rotation AX of the hub 2.

Under such circumstances, the support 10 is constrained to rotate with the hub 2 about its axis of rotation AX.

Furthermore, it should be observed that each main oscillating mass is arranged in an empty space between an offset 3' and an adjacent arm 3.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, it is possible to provide deformable means that have at least three deformable blades. Under such circumstances, the path followed by each distributed mass constitutes movement in circular translation like a variant having two deformable blades. Consequently, it is necessary to adjust the stiffness of each deformable blade 30 to match the value of each main oscillating mass in order to conserve the looked-for resonance characteristics.

Furthermore, in order to match each main oscillating mass or secondary oscillating mass as well as possible to the looked-for resonance characteristics, each main oscillating mass and/or each secondary oscillating mass may be provided with means for adjusting its respective mass, e.g. by fastening additional weights thereto with the help of conventional means.

What is claimed is:

1. A distributed mass device for reducing the vibration generated by a rotorcraft lift rotor having a hub, said distributed mass device comprising a support suitable for being constrained in rotation about an axis of rotation of said lift rotor, wherein the distributed mass device includes at least two main oscillating masses each having a through longitudinal recess, said main oscillating masses being distributed around said support, each being connected to the support by deformable means, the main oscillating masses being constrained to move solely in a horizontal plane by said deformable means, each main oscillating mass being provided with a secondary oscillating mass suspended inside the recess of the associated main oscillating mass by resilient means so as to be capable of moving along a direction that is perpendicular to said horizontal plane.

2. A distributed mass device according to claim 1, wherein the main oscillating masses are distributed in equidistant manner around the support.

3. A distributed mass device according to claim 1, wherein said deformable means comprise a deformable blade per main oscillating mass to connect each main oscillating mass to said support.

4. A distributed mass device according to claim 3, wherein each deformable blade extends radially from said support to be fastened to the main mass associated with the deformable blade.

5. A distributed mass device according to claim 1, wherein said deformable means comprise at least two deformable blades per main oscillating mass to provide a deformable parallelogram connecting each main oscillating mass to said support.

6. A distributed mass device according to claim 1, including guide means for each secondary oscillating mass to guide each secondary oscillating mass in translation relative to the associated main oscillating mass.

7. A distributed mass device according to claim 6, wherein said guide means comprise a ball bushing arranged between the main oscillating mass and the associated secondary oscillating mass.

8. A distributed mass device according to claim 6, wherein said guide means comprise a ring covered in a self-lubricating material.

9. A distributed mass device according to claim 1, wherein each resilient means comprise first and second springs, and each secondary oscillating mass is arranged inside the associated main oscillating mass between the first and second springs of the corresponding resilient means.

10. A distributed mass device according to claim 9, wherein said first and second springs are prestressed respectively between:

the secondary oscillating mass and a first closure means for closing the recess of the associated main oscillating mass;

and the secondary oscillating mass and a second closure means for closing the recess of the associated main oscillating mass.

11. A distributed mass device according to claim 1, wherein a main oscillating mass and the associated secondary oscillating mass are cylindrical.

12. A hub of a rotorcraft lift rotor, the hub being provided with a bottom portion suitable for being secured to a rotorcraft rotor mast and includes a top portion that is substantially parallel to said bottom portion, and that is constrained to rotate with the support of a distributed mass device according to claim 1.

13. A distributed mass device for reducing the vibration generated by a rotorcraft lift rotor having a hub, said distributed mass device comprising:

a support suitable for being constrained in rotation about an axis of rotation of said lift rotor;

at least two blades connected to the support and extending radially outwards in a horizontal plane, the at least two blades configured to deform and deflect in the horizontal plane; and at least two main oscillating masses each having a through longitudinal recess, said main oscillating masses being distributed around said support, each being connected to one of the at least two blades, each main oscillating mass constrained to oscillate solely in the horizontal plane by the blade deforming thereby filtering resultant forces of the rotor, each main oscillating mass having a secondary oscillating mass suspended inside the recess of the associated main oscillating mass by resilient means and configured to move along a direction that is perpendicular to said horizontal plane.

\* \* \* \* \*